United States Patent [19]

Kanao

[11] Patent Number: 5,644,832
[45] Date of Patent: Jul. 8, 1997

[54] METHOD OF PROVIDING SEALING CONNECTION BETWEEN CORRUGATED SPIRAL PIPES

[76] Inventor: Shiro Kanao, 9-18, Nanpeidai 4-chome, Takatsuki-shi, Osaka, Japan

[21] Appl. No.: 390,798

[22] Filed: Feb. 17, 1995

Related U.S. Application Data

[62] Division of Ser. No. 121,889, Sep. 17, 1993, Pat. No. 5,415,440.

[30] Foreign Application Priority Data

Sep. 18, 1992 [JP] Japan ........................ 4-275038

[51] Int. Cl.⁶ .................................................. B23P 25/00
[52] U.S. Cl. ........................... 29/458; 29/460; 29/525; 29/530; 285/369; 285/903; 285/910
[58] Field of Search ............................ 29/458, 460, 467, 29/530, 525; 285/294, 295, 296, 297, 369, 903, 910

[56] References Cited

U.S. PATENT DOCUMENTS

| | | | |
|---|---|---|---|
| 2,032,492 | 3/1936 | Nathan | 29/525 |
| 2,615,741 | 10/1952 | Nathan | 285/369 |
| 3,380,763 | 4/1968 | Schmunk | 285/369 |
| 4,182,519 | 1/1980 | Wilson | 285/369 |
| 4,398,726 | 8/1983 | Heisler | 285/295 |
| 4,686,756 | 8/1987 | Johnson | 29/525 |
| 4,702,502 | 10/1987 | Shade et al. | 285/369 |
| 4,946,206 | 8/1990 | Roe et al. | 285/910 |
| 5,326,138 | 7/1994 | Claes et al. | 285/910 |
| 5,383,693 | 1/1995 | Shade | 285/903 |

FOREIGN PATENT DOCUMENTS

| | | | |
|---|---|---|---|
| 509970 | 10/1992 | European Pat. Off. | 285/903 |
| 1492157 | 7/1989 | U.S.S.R. | 285/903 |

Primary Examiner—David P. Bryant
Attorney, Agent, or Firm—Sughrue, Mion, Zinn, Macpeak & Seas

[57] ABSTRACT

A corrugated spiral pipe with a joint is formed by the steps of winding a seal material on thread portions of a pipe end of a spiral pipe, fitting a part of a cylindrical joint body to the pipe end so as to cover a portion on which the seal material has been wound, injecting a liquid foamable resin material through an injection hole and letting it foam, and filling a trough portion of the spiral pipe with the foamed resin material so as to make the spiral pipe watertight for coupling purposes. When the spiral pipe with the joint is coupled to another spiral pipe, a waterstop is forced into a trough portion of a pipe end portion of the latter pipe, an elastic seal ring is fitted onto an outer peripheral face of the latter pipe, and the pipe end of the latter pipe is forced into an outward protruded portion of the joint body.

2 Claims, 5 Drawing Sheets

METHOD OF PROVIDING SEALING CONNECTION BETWEEN CORRUGATED SPIRAL PIPES

This is a divisional of application Ser. No. 08/121,889, filed Sep. 17, 1993, now U.S. Pat. No. 5,415,440.

BACKGROUND OF THE INVENTION

The present invention relates to a corrugated spiral pipe with a joint, a process of producing the same, and a method of providing sealing connection between the corrugated spiral pipe with a joint and another corrugated spiral pipe without such a joint.

Conventional corrugated spiral pipes have been coupled together through steps of inserting ends of both the spiral pipes into a pipe joint so as to abut on each other and applying a sealing means to each of them before or after the inserting step at a place where they are practically used.

Thus, since the work of coupling such conventional spiral pipes is usually done by unskilled workers at piping sites which are not always preferable ones and besides affected by not only the temperature but also the weather, a great deal of time and labor are necessitated and this poses a serious problem in that piping work cannot be done efficiently. Moreover, the conventional piping work needs pipe joints in addition to spiral pipes to be connected at each place of work and the problem is that these pipe joints have to be transported.

SUMMARY OF THE INVENTION

In order to solve the foregoing problems of conventional spiral pipes, an object of the present invention is to provide a corrugated spiral pipe fitted with a joint to an end of the spiral pipe by skilled workers in factories without being affected by the weather and the like so as to facilitate the work of coupling pipes at a piping site and realize speed-up of a piping work. Another object of the present invention is to provide a method of providing sealing connection between spiral pipes with efficiency.

A spiral pipe according to a first aspect of the present invention includes a corrugated spiral pipe which has a spirally corrugated outer surface and is made of synthetic resin, and a cylindrical joint body having an inside diameter greater than an outside diameter of a thread portion of the spiral pipe, wherein a fitted portion of the joint body is fitted onto a pipe end of the spiral pipe while a remaining protruded portion of the joint body is protruded outward from the pipe end of the spiral pipe, a belt-like seal material is wound with substantially two or more turns between an inner peripheral face of the fitted portion of the joint body and an outer peripheral face of the thread portion of the pipe end, and a space in a trough portion enclosed with the seal material is filled with a foamed resin material, so that the joint body and the pipe end of the spiral pipe are jointed together with watertightness.

Another spiral pipe according to a second aspect of the present invention includes a corrugated spiral pipe and a cylindrical joint body having an inside diameter greater than an outside diameter of a thread portion of the spiral pipe, wherein a protruded portion of the joint body is protruded outward from the spiral pipe while a remaining fitted portion of the joint body is fitted onto a pipe end of the spiral pipe, a belt-like seal material is wound with substantially one or more turns between an inner peripheral face of the fitted portion of the joint body and an outer peripheral face of the thread portion of the pipe end, and a space between the seal material and an outer peripheral portion of a cut edge face of the spiral pipe is filled with a foamed resin material so as to couple the joint body and the pipe end of the spiral pipe together with watertightness.

A process of producing the spiral pipe of the first aspect of the present invention comprises the steps of winding a belt-like seal material with substantially two or more turns on thread portions of a pipe end of the spiral pipe, fitting a cylindrical joint body in such a way that a protruded portion of the joint body is protruded outward from the spiral pipe while a remaining fitted portion of the joint body is fitted onto a pipe end of the spiral pipe so as to cover a portion on which the seal material has been wound, injecting a liquid foamable resin material through an injection hole formed in the fitted portion and letting the resin material foam to fill a space in the trough portion enclosed with the seal material with the foamed resin material so as to couple the joint body and the pipe end of the spiral pipe together with watertightness.

A process of producing the corrugated spiral pipe of the second aspect of the present invention includes the steps of winding a belt-like seal material with one or more turns on thread portions of a pipe end of the spiral pipe which has a spirally corrugated outer surface and is made of synthetic resin, inserting the pipe end portion of the spiral pipe onto a small diameter portion of a joint coupler having a large diameter portion and the small diameter portion, positioning a joint body so that a protruded portion of the joint body positions on the large diameter portion and a remaining portion of the joint body covers a portion on which the seal material has been wound, injecting a liquid foamable resin material through an injection hole formed in the joint body into a space between the portion on which the seal material has been wound and a stepped boundary portion between the small diameter portion and the large diameter portion of the joint coupler and letting the resin material foam to fill the space between the portion on which the seal material has been wound and the stepped portion with the foamed resin material so as to couple the joint body and the pipe end of the spiral pipe together with watertightness.

A method of coupling a corrugated spiral pipe with a joint to another corrugated spiral pipe comprises the steps of forcing a block of waterstop having a cross section slightly greater than that of a trough portion of a pipe end of the another corrugated spiral pipe to be connected into the trough portion of the another pipe, fitting an elastic sealing ring with annular ridges formed on the outer peripheral face onto an outer peripheral face of the pipe end of the another spiral pipe in such a way as to cover the surface of the waterstop, and forcing the pipe end of the another pipe into an outer protruded portion of the joint body.

The seal material according to the present invention is preferably a soft belt made of rubber or soft synthetic resin, or a belt made of foamed material since it is easily wound on the spiral pipe. Moreover, its cross section is preferably T-shaped since it is easy to regulate a position by fitting a protruded portion of the T-shaped seal material at the lower face side into the trough portion of the spiral pipe. An adhesive may be applied to the undersurface of the seal material beforehand, so that it is conveniently fixed by sticking the undersurface thereof to the thread portions of the spiral pipe.

With the arrangement above according to the present invention, the corrugated spiral pipe with a joint can be manufactured consecutively with watertightness by skilled workers in factories without being affected by the weather.

The pipes thus manufactured can also be transported at all times as those equipped with joints and this makes it unnecessary to transport joints separately. Therefore, the work of coupling these spiral pipes to any other spiral pipe can be started immediately at piping sites. Since the pipe joint is secured to a pipe end of one spiral pipe, the other spiral pipe can immediately be coupled thereto.

The process of producing a corrugated spiral pipe with a joint according to the present invention ensures that the joint body is readily fitted to a pipe end of the spiral pipe with watertightness and this is advantageous in that pipes can be coupled together easily and quickly at any piping site.

DETAILED DESCRIPTION OF THE INVENTION

Referring to the accompanying drawings, preferred embodiments of the present invention will be described. For the convenience of description, a process of manufacturing a spiral pipe with a joint will be described first.

Figure 1:
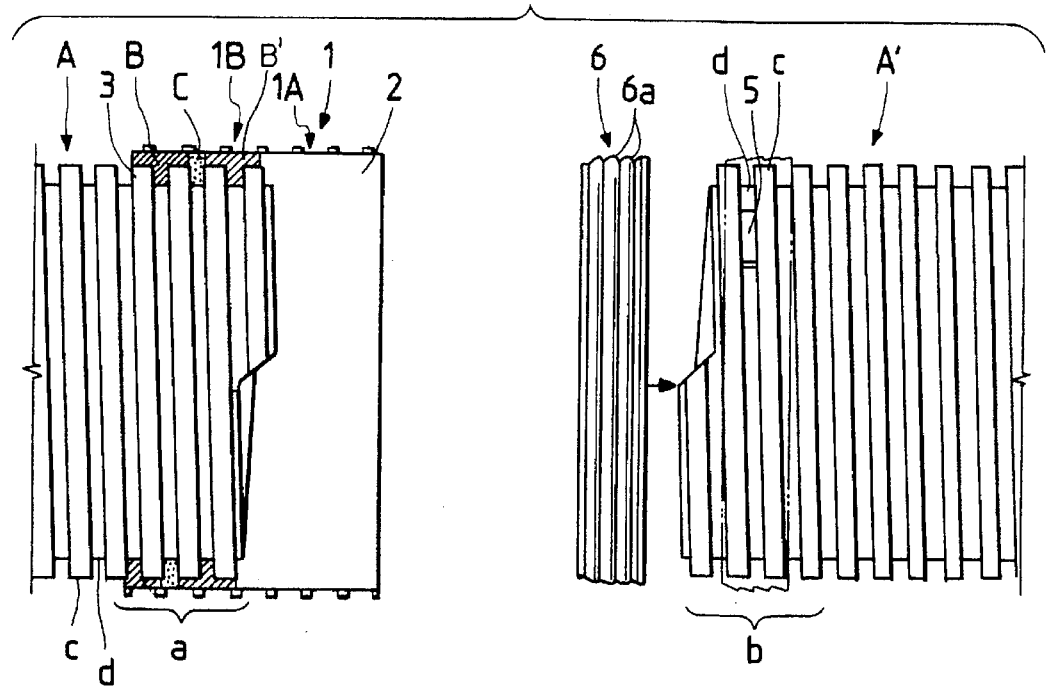
FIG. 1 is a partial cutaway side view of a first embodiment of the present invention.
Figure 2:
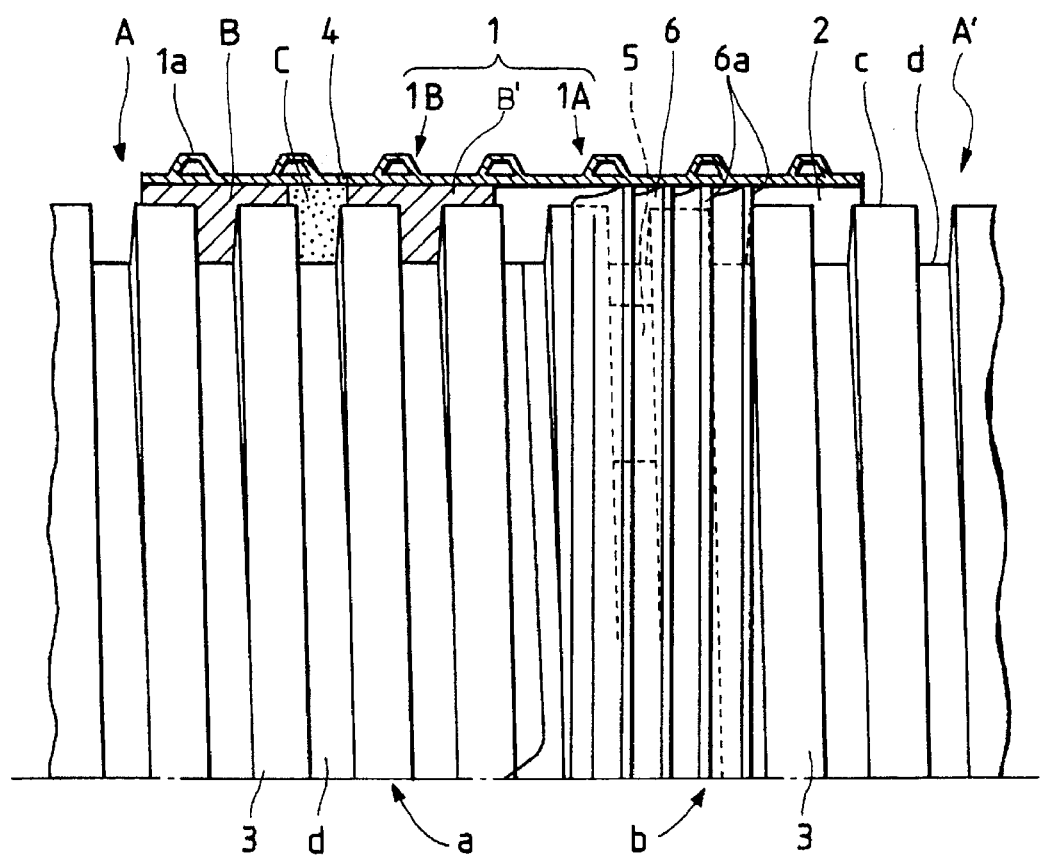
FIG. 2 is a sectional view of the main part of FIG. 1.

FIGS. 1 and 2 illustrate a first embodiment of the present invention. FIG. 1 shows a state in which one spiral pipe (A) and another spiral pipe (A') have not yet been coupled together, and FIG. 2 shows a state in which both of them have been coupled Both of the corrugated spiral pipes (A) and (A') have a spirally corrugated outer surface and are made of hard synthetic resin. First, two belt-like sealing materials (B) and (B') each of which is T-shaped in cross section, are wound with more than one turn on thread portions (c) of a pipe end (a) of one corrugated spiral pipe (A) so that the upper flat portion of each of the T-shaped sealing materials is positioned on the thread portions so as to sandwich one trough portion (d) between the thread portions. Then, a cylindrical joint body 1 is fitted to cover the portion thus wound so that about half the portion 1A in the longitudinal direction is protruded outside while the remaining half 1B thereof is kept sticking to the pipe. Further, a liquid foamable material such as liquid foamable urethane (C) is injected into the trough portion (d) through an injection hole 4 formed in the portion (1B). The liquid foamable material is left to foam so as to fill the space in the trough portion (d) with the foamed urethane (C). The joint body 1 is thus coupled to the pipe end (a) of the spiral pipe (A) With watertightness.

In the spiral pipe (A) with the joint body 1 coupled thereto, the cylindrical joint body 1 has an inside diameter greater than an outside diameter of the thread portion (c) of the spiral pipe, the part 1A of the joint body protrudes outside, and the remaining portion 1B thereof is fitted onto the pipe end (a) of the spiral pipe (A). The two belt-like sealing materials (B) and (B') are held between an inner peripheral face 2 of the portion 1B and an outer peripheral face 3 of the pipe end (a) of the spiral pipe. The spiral pipe (A) with a joint thus obtained has space in the trough portion (d) enclosed with the two sealing materials (B) and (B') and filled with the foamed urethane (C) with watertightness.

A process of coupling the spiral pipe (A) with a joint to another spiral pipe (A') will be described. First, a block of waterstop material 5, for example, a butyl rubber block having a cross section slightly greater than that of a trough portion (d) of the other spiral pipe (A') is completely buried in the trough portion (d) of a pipe end (b) of the spiral pipe (A'). The block 5 is forced into the trough portion of the spiral pipe (A') in such a way as to protrude the upper face thereof slightly outside the outer peripheral face 3 of the thread portion (c). Then, an elastic seal ring 6 having a smooth inner peripheral face and an outer peripheral face having a plurality of annular ridges 6a, for example, an elastic rubber ring 6 is fitted onto the outer peripheral face of the pipe end portion (b) of the spiral pipe (A') so as to cover the surface of the waterstop material 5. Further, the pipe end portion (b) is forced into the outer protrusion 1A of the joint body 1 of the spiral pipe (A).

The spiral pipe (A') thus fitted with the elastic seal ring 6 is forced into the joint body 1 of the spiral pipe (A) so as to couple the spiral pipe (A) with a joint and the spiral pipe (A') together. The spiral pipe (A') thus coupled is kept watertight because the thread portions (c) and the trough portion (d) are made watertight by the elastic seal ring 6 and the block 5, respectively.

Figure 3:
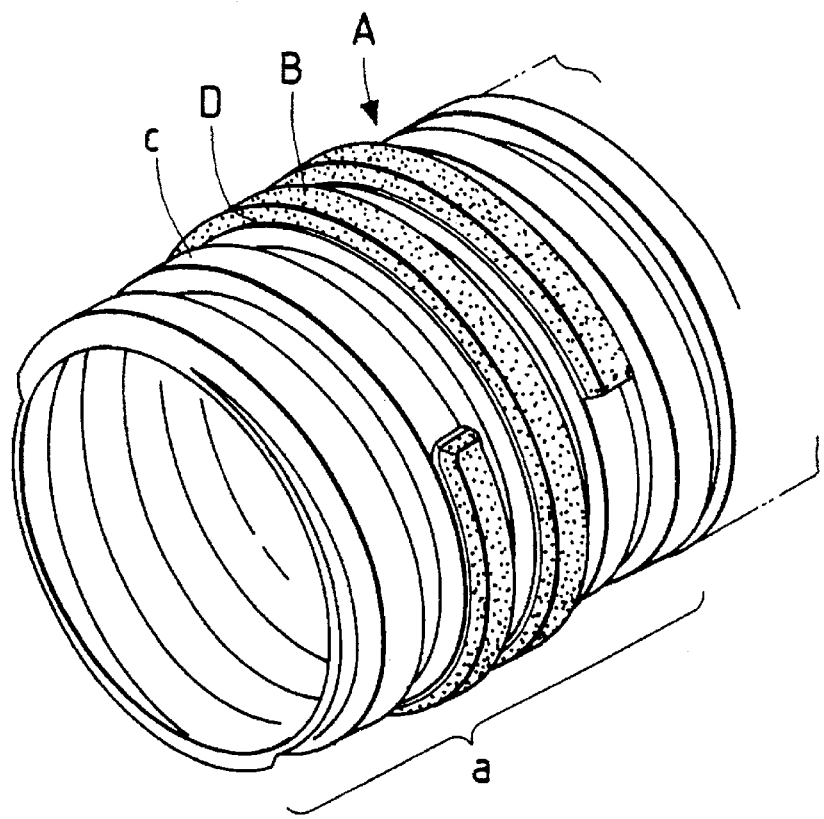
FIG. 3 is a perspective view of a second embodiment of the present invention.
Figure 4:
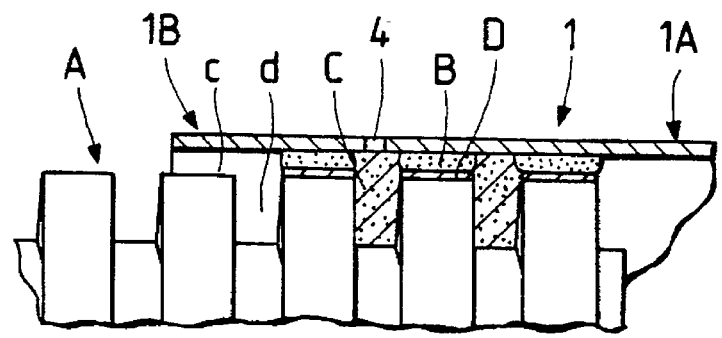
FIG. 4 is a sectional view of the main part of FIG. 3.

FIGS. 3 and 4 show a second embodiment of the present invention which relates to a process of obtaining a spiral pipe with a joint. The process comprises the steps of winding a single belt-like seal material (B), which is made of foamed synthetic resin and provided with an adhesive (D) on one side thereof and a release paper (not shown) temporarily pasted thereto, with about two turns onto thread portions (c) of a pipe end of a corrugated spiral pipe (A), joining the seal material (B) onto the thread portions (c), fitting a cylindrical joint body 1 so as to make about the half the portion (1A) in the longitudinal direction protrude outward from the pipe while keeping the remaining half (1B) covering over a portion where the seal material is wound, injecting a liquid foamable urethane resin material (C) through an injection hole 4-formed in the remaining portion (1B) into the space in a trough portion (d), and causing the urethane resin to foam so as to fill the space in the trough portion (d) of the spiral pipe (A) enclosed with the seal material (B) with the foamed urethane resin material (C). The joint body 1 is thus coupled to the pipe end (a) of the spiral pipe (A). The spiral pipe with a joint embodying the present invention may also be obtained through this process.

Figure 5:
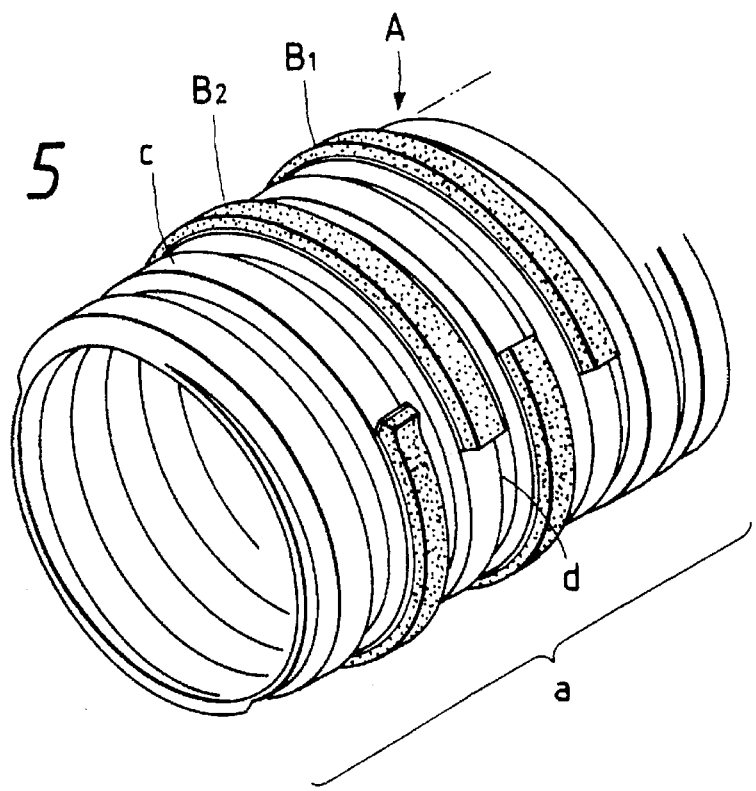
FIG. 5 is a perspective view of a seal material wound in a different form.
Figure 6:
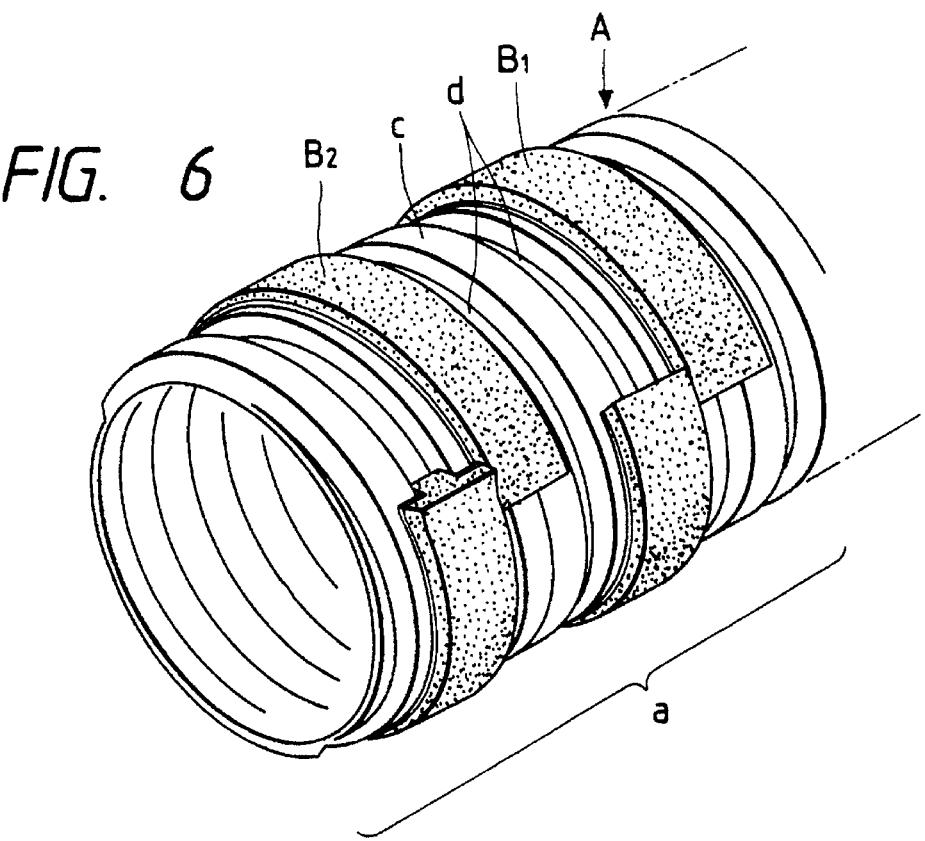
FIG. 6 is a perspective view of the seal material wound in still another different form.

A single belt-like seal material (B) has been wound with two or more turns on the thread portions (c) of the spiral pipe (A) according to the embodiment as shown in FIGS. 3 and 4. However, as shown in FIGS. 5 and 6, the seal material (B) may be divided into two parts (B1), (B2), these seal materials may be wound with substantially one turn on both thread portions (c) with a predetermined number of trough portions (d), for example, one or two trough portions intervening therebetween, and the spaces enclosed with these seal materials (B1), (B2) may be filled with the foamed urethane resin material (C) so as to couple the joint body 1.

Figure 7:
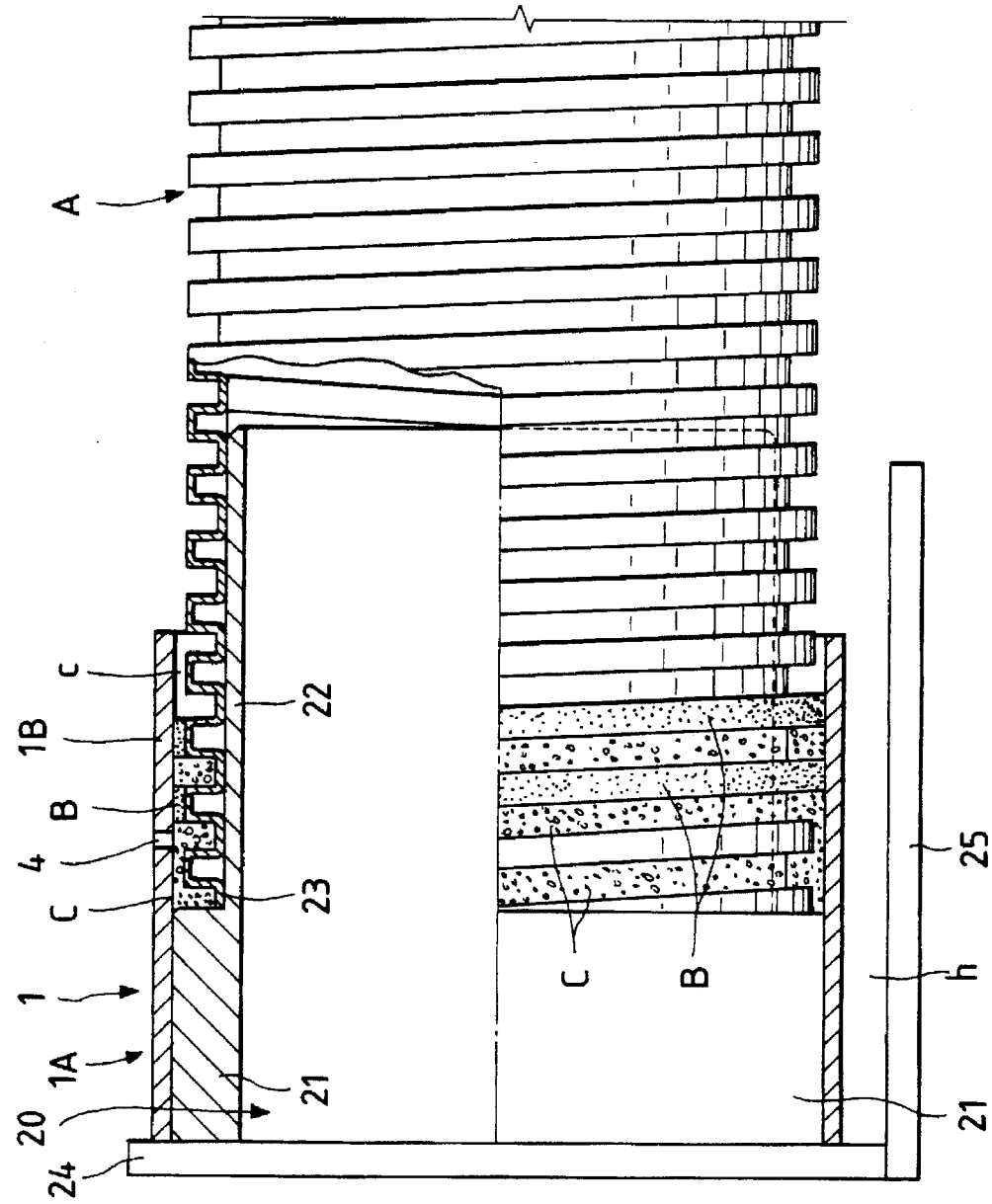
FIG. 7 is a partial broken side view of a third embodiment of the present invention.

Another manufacturing process will subsequently be described. According to a third embodiment shown in FIG. 7, a joint is coupled to an end of a spiral pipe (A) using a joint coupler 20. The joint coupler 20 formed in this embodiment is of two-stage cylindrical structure (or may be rod-shaped) and has a large diameter portion 21 whose outside diameter is set substantially equal to the inside diameter of a joint body 1 ad whose length is set substantially half the length of the joint body 1, and a small diameter portion 22 whose outside diameter is set substantially equal to the inside diameter of the spiral pipe (A) and whose length is set substantially equal to that of the joint body 1, the small diameter portion being elongated via a stepped boundary portion 23 on one side of the large diameter portion 21. The large diameter portion 21 of the joint coupler 20 is fitted sideways to an upright plate 24 installed at one end of a base plate 25 with a space (h) so as to prevent the lower portion of the joint coupler from abutting against the base plate 25. An apparatus thus fabricated is used according to the present embodiment.

In the apparatus mentioned above, the small diameter portion 22 may be made shorter although its length has been set substantially equal to that of the joint body 1; however, if it is too short, the horizontal position of the spiral pipe (A) tends to become less stable. The small diameter portion 22 may be made longer on the contrary; however, if it is too long, there arises inconvenience when the spiral pipe (A) is taken in and out. In consideration of both cases, the length of the small diameter portion 22 has been set as stated above. The space (h) between the large diameter portion 21 and the base plate 25 may be at least large enough to allow the joint body 1 to be taken in and out.

First, one end 1A of the joint body 1 is inserted onto the large diameter portion 21 of the apparatus. Then, the end portion of the spiral pipe (A) with the belt-like seal material (B) wound on the thread portions (c) of the end (a) of the pipe with substantially one turn is inserted between the small diameter portion 22 of the joint coupler 20 and the other end 1B of the joint body 1. In this way, the part 1A of the joint body 1 is positioned on the large diameter portion 21 and the remaining portion 1B is made to cover the outer periphery of a portion on which the seal material (B) has been wound. Then, the liquid foamable resin material (C) is injected through an injection hole 4 preformed in the joint body 1 into the gap formed with the portion on which the seal material (B) has been wound, and the stepped boundary portion 23 between the small diameter portion 22 and the large diameter portion 21 of the joint coupler 20. The resin material (C) is left to foam so as to fill the space between the seal material wound portion and the stepped portion 23 with the foamed resin material (C). The spiral pipe (A) is taken out of the joint coupler 20 after the injected resin material (C) is hardened.

The one side 1A of the joint body 1 may be inserted in the large diameter portion 21 after the end portion of the spiral pipe (A) is inserted in the small diameter portion 22. In this case, the following steps may be taken: namely, the steps of winding the seal material (B) on the thread portions (c) of the end (a) of the pipe after or before the joint body 1 is fitted onto the spiral pipe (A), then inserting the pipe end portion of the spiral pipe (A) onto the outer periphery of the small diameter portion 22 of the joint coupler 20, and moving the joint body 1 via an upper portion of the seal material (B) onto the large diameter portion 21.

The structure of the spiral pipe with a joint thus obtained is such that: substantially the first half 1A of the length of the cylindrical joint body 1 protrudes outside; substantially the second half 1B thereof is fitted onto the end (a) of the spiral pipe (A) the belt-like seal material (B) is fitted in the space between the inner peripheral face 2 of the portion 1B thus fitted and the outer peripheral face 3 of each thread portion (c) of the end (a) of the pipe; and the space between the seal material (B) and the outer peripheral portion of the cut edge face of the spiral pipe (A) is filled with the foamed resin material (C); and the joint body 1 is coupled to the end (a) of the spiral pipe (A) in a watertight condition.

The structure of the joint body 1 used according the present invention may have reinforcing ribs 1a in the peripheral (or longitudinal) direction of the outer peripheral face as shown in FIGS. 1–2, or may be in a simple cylindrical form which is smooth inside and outside as shown in FIG. 4. Although this structure is not restrictive, the joint body is readily obtainable as follows.

Figure 8:
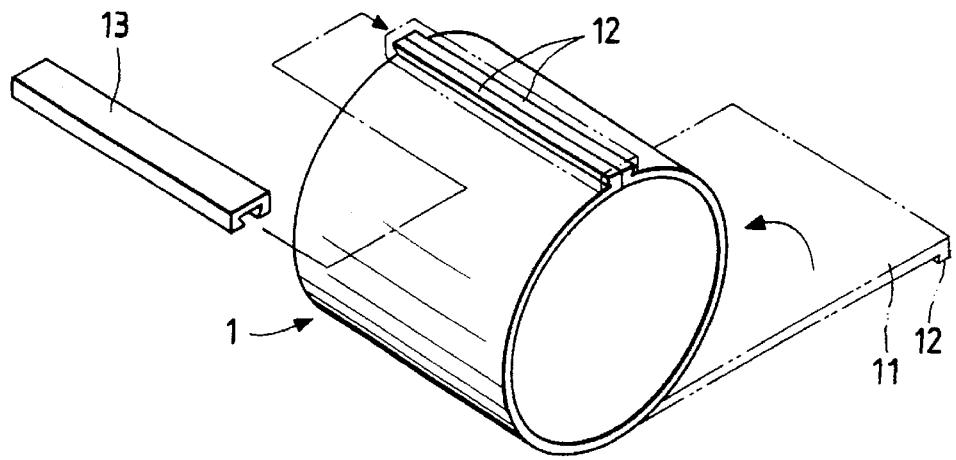
FIG. 8 is a perspective view of means for forming a joint.
Figure 9:
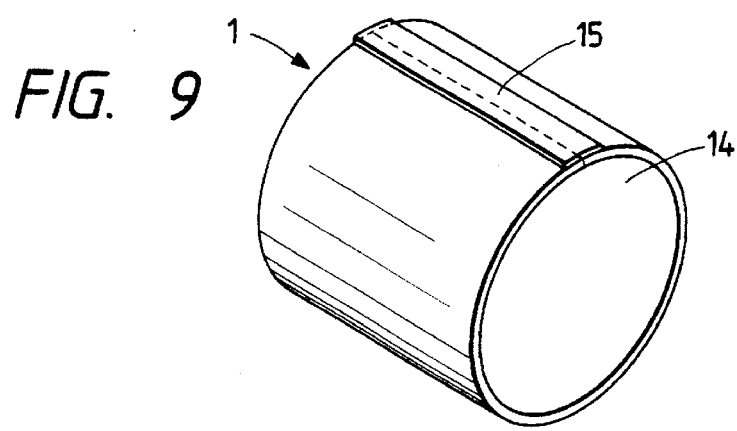
FIG. 9 is a perspective view of another means for forming the joint.

FIGS. 8–10 illustrate means for forming the joint body 1. In FIG. 8, the cylindrical joint body 1 is formed by extruding a sheet-like material 11 having a predetermined width together with ribs 12, 12 which are triangular in cross section and protrude from both lateral side portions in the same direction, cutting the material to a predetermined length in the longitudinal direction, rounding the material in the lateral direction to let the ribs 12, 12 abut against each other, and fitting a coupler 13 to a combination of the ribs 12, 12 abutting against each other, the coupler having a dovetail groove which is the same in configuration as the combination of the ribs.

In FIG. 9, the cylindrical joint body 1 is formed by cutting a sheet-like material 14 to a predetermined length and width, rounding the material in a lateral direction to let both ends thereof abut against each other, applying another slender belt-like material 15 to the outer peripheral face of the portion where both the ends abut against each other, and fusion-coupling the belt-like material 15 thereto by means of ultrasonic waves, a heated plate or the like.

Figure 10A:
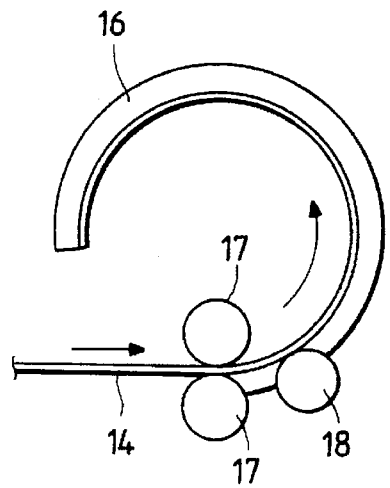
FIGS. 10(a) and 10(b) are side views of still another means for forming the joint and a joint body.
Figure 10B:
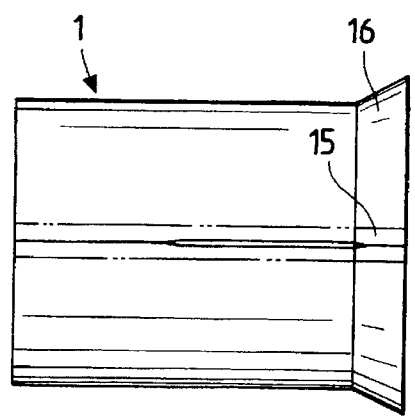

In FIGS. 10(a) and 10(b), the joint body 1 is formed by feeding a long sheet-like material 14 having a predetermined width through forming rollers 17, 17 arranged opposite to each other, bending the material in an arcuate form by means of a guide roller 18 while one side of it in the lateral direction is being elongated outwardly, cutting the material 14 to a desired length, abutting both ends of it against each other, applying a belt-like material 15 to the outer peripheral face of both the ends thus abutting against each other as in the case of FIG. 9, and fusion-coupling both the ends thus abutting against each other by means of ultrasonic waves, a heated plate or the like to form the cylindrical joint body 1 having a tapered portion 16 at one end in the axial direction. The tapered portion 16 is protruded outward when the joint body is coupled to the spiral pipe (A), so that it is used as a guide for facilitating insertion into the joint body 1 when the spiral pipe (A) is coupled to the other spiral pipe (A').

Although a description has been given of exemplary coupling structures, the present invention is not necessarily limited to those described above but may be implemented with proper modification as long as it is capable of meeting the above described structural requirements of the present invention, achieving the objects of the present invention and obtaining the following effects.

As is obvious from the description given so far, the corrugated spiral pipe with a joint can be manufactured consecutively with uniform watertightness by skilled workers in factories without being affected by the outside temperature, the weather and the like. The pipe thus manufactured can also be conveyed at all times as that equipped with a joint and this makes it unnecessary to transport a joint separately. Further, the advantage is that the end of another pipe can be coupled to the outer protrusion of the joint body readily and quickly with the effect of facilitating piping work at a piping site.

With respect to the process of producing a corrugated spiral pipe with a joint, the joint body is fitted onto the outer peripheral portion of the belt-like seal material wound on the thread portions of the end of the spiral pipe and a liquid or jelly foamable material is injected through the injection hole formed in the fitted portion into the inner space. Then, the space between the spiral pipe and the joint body is filled with the foamed material. As this process is performed by skilled workers in factories and the like, the advantage is also that the joint can be fitted to the spiral pipe readily and surely with watertightness.

According to the method of connecting pipes at piping sites, which intends for the above described corrugated spiral pipe with the joint, after a block of waterstop is forced into a trough portion of an end of another spiral pipe to be coupled and an elastic seal ring is fitted on the outer peripheral face of the end of the another pipe, the end of the another pipe is forced into the outer protrusion of the joint body of the spiral pipe with the joint. Therefore, this method is greatly advantageous in that the work of connecting pipes at the piping sites can be extremely easily and quickly carried out, and the connection of the pipes can be certainly carried out with watertightness.

What is claimed is:

1. A method of providing sealing connection between a first corrugated pipe with a joint and a second corrugated pipe, the first and second pipes each having a spirally corrugated outer surface and being made of synthetic resin, the joint comprising a cylindrical joint body having an inside diameter greater than an outside diameter of the corrugations of said first pipe and being attached to said first pipe so that a protruded portion of said joint body protrudes outward from said first pipe while a remaining fitted portion of said joint body is fitted onto said first pipe with one strip of seal material wound between and in intimate contact with an inner peripheral face of said fitted portion of said joint body and an outer peripheral face of said corrugations of said first pipe, said one strip of seal material being wound with one or more turns around said first pipe, forming a space which is defined by said one strip of seal material, said inner peripheral face of said fitted portion, and said corrugated outer surface of said first pipe, said space being filled with a foamed resin material so as to couple said joint body and said first pipe together with watertightness, said method comprising the steps of:

forcing a block of waterstop having a cross section slightly greater than that of a trough portion of the corrugations of said second pipe into said trough portion of said second pipe;

fitting an elastic sealing ring with annular ridges formed on an outer peripheral face thereof onto an outer peripheral face of said second pipe in such a way as to cover an outer surface of said block of waterstop; and forcing said second pipe into said protruded portion of said joint body such that an inner peripheral face of said sealing ring frictionally engages said outer surface of said block of waterstop and said outer peripheral face of said second pipe, and the annular ridges of said sealing ring frictionally engage an inner peripheral face of said protruded portion of said joint body.

2. A method of providing sealing connection between a first corrugated pipe with a joint and a second corrugated pipe, the first and second pipes each having a spirally corrugated outer surface and being made of synthetic resin, the joint comprising a cylindrical joint body having an inside diameter greater than an outside diameter of the corrugations of said first pipe and being attached to said first pipe so that a protruded portion of said joint body protrudes outward from said first pipe while a remaining fitted portion of said joint body is fitted onto said first pipe with two strips of seal material wound between and in intimate contact with an inner peripheral face of said fitted portion of said joint body and an outer peripheral face of said corrugations of said first pipe, each of said two strips of seal material being wound with one or more turns around said first pipe, forming space which is defined by said two strips of seal material, said inner peripheral face of said fitted portion, and said corrugated outer surface of said first pipe, said space being filled with a foamed resin material so as to couple said joint body and said first pipe together with watertightness, said method comprising the steps of:

forcing a block of waterstop having a cross section slightly greater than that of a trough portion of the corrugations of said second pipe into said trough portion of said second pipe;

fitting an elastic sealing ring with annular ridges formed on an outer peripheral face thereof onto an outer peripheral face of said second pipe in such a way as to cover an outer surface of said block of waterstop; and forcing said second pipe into said protruded portion of said joint body such that an inner peripheral face of said sealing ring frictionally engages said outer surface of said block of waterstop and said outer peripheral face of said second pipe, and the annular ridges of said sealing ring frictionally engage an inner peripheral face of said protruded portion of said joint body.

* * * * *